United States Patent [19]
Bush et al.

[11] Patent Number: 6,019,667
[45] Date of Patent: Feb. 1, 2000

[54] METHOD FOR GRINDING SILICON METALLOID

[75] Inventors: Thomas Alva Bush, Wheeler, Mich.; John Eric Herman, LaGrange; Ollie William Marko, Carrollton, both of Ky.

[73] Assignee: Dow Corning Corporation, Midland, Mich.

[21] Appl. No.: 09/084,275

[22] Filed: May 26, 1998

[51] Int. Cl.⁷ .................................................. B24B 1/00
[52] U.S. Cl. ................................. 451/36; 241/15
[58] Field of Search ................. 241/15, 22, 27, 241/29; 451/36, 38

[56] References Cited

U.S. PATENT DOCUMENTS

| | | | |
|---|---|---|---|
| 3,604,634 | 9/1971 | Windle | 241/16 |
| 4,162,044 | 7/1979 | Manfroy et al. | 241/16 |
| 4,162,045 | 7/1979 | Katzer et al. | 241/16 |
| 4,274,599 | 6/1981 | Manfroy et al. | 241/16 |
| 4,486,567 | 12/1984 | Bowman et al. | 524/863 |
| 5,131,600 | 7/1992 | Klimpel et al. | 241/16 |
| 5,312,948 | 5/1994 | Freeburne et al. | 556/472 |
| 5,346,941 | 9/1994 | Furukawa et al. | 524/268 |
| 5,573,619 | 11/1996 | Benedict et al. | 156/137 |
| 5,620,632 | 4/1997 | Chari | 252/311 |
| 5,624,079 | 4/1997 | Higuchi et al. | 241/39 |
| 5,657,931 | 8/1997 | Nair et al. | 241/21 |
| 5,882,246 | 3/1999 | Inkyo et al. | 451/87 |

*Primary Examiner*—Joseph J. Hail, III
*Assistant Examiner*—William Hong
*Attorney, Agent, or Firm*—Melvin D. Fletcher

[57] ABSTRACT

A method for grinding silicon metalloid comprising grinding silicon metalloid in the presence of an effective amount of a grinding aid selected from the group consisting of carboxylic acids comprising at least 8 carbon atoms, alkali metal salts of carboxylic acids comprising at least 8 carbon atoms, and polydiorganosiloxanes.

15 Claims, No Drawings

METHOD FOR GRINDING SILICON METALLOID

BACKGROUND OF INVENTION

The present invention is a method for grinding silicon metalloid comprising grinding silicon metalloid in the presence of an effective amount of a grinding aid selected from the group consisting of carboxylic acids comprising at least 8 carbon atoms, alkali metal salts of carboxylic acids comprising at least 8 carbon atoms, and polydiorganosiloxanes.

Silicon metalloid (herein in the alternative referred to as "silicon") is a key raw material in organohalosilanes produced commercially in the fluidized-bed process often referred to as the Direct Process. In the Direct Process for producing alkylhalosilanes, an alkylhalide is reacted with particulate silicon in the presence of a catalyst comprising copper. It has long been recognized that in the Direct Process the size of the particulate silicon is important in determining the efficiency of the reaction of alkyl halides with silicon to form alkylhalosilanes. The efficiency of the reaction of alkyl halides with silicon is determined based on the amount of silicon charge that is converted to diakyldihalosilane and this conversion is in part dependent on the silicon particle size.

Windle, U.S. Pat. No. 3,604,634, describes a method of grinding calcium carbonate minerals comprising the steps of (a) forming an aqueous suspension comprising at least 25 percent by weight of the calcium carbonate mineral, and (b) grinding the aqueous suspension of calcium carbonate mineral with a particulate grinding material such as silica sand, calcined clay, flint granules, ceramic and glass beads.

Manfroy et al., U.S. Pat. Nos. 4,162,044 and 4,274,599, describe a process for grinding coal or ores containing metal values comprising carrying out the grinding in a liquid medium and with a grinding aid comprising an anionic polyelectrolyte derived from polyacrylic acid and dispersible in the liquid medium, the grinding aid being present in an amount effective to provide increased grinding efficiency.

Klimpel et al., U.S. Pat. No. 5,131,600, describe a process for the wet grinding of silica or siliceous gangue-containing solids comprising carrying out the grinding operation in the presence of liquid medium and at least one alkanol amine dispersible in the liquid medium.

Freeburne et al., U.S. Pat. No. 5,312,948, teach a process for the reaction of an alkyl halide with particulate silicon in a fluidized-bed process, where the particle size of the silicon is within a range of one micron to 85 microns.

The present invention provides a method for grinding silicon in the presence of an effective amount of a grinding aid selected from the group consisting of carboxylic acids comprising at least 8 carbon atoms, alkali metal salts of carboxylic acids comprising at least 8 carbon atoms and polydiorganosiloxanes to increase mill capacity, increase silicon grinding rate, increase silicon flowability, decrease silicon agglomeration and to narrow silicon particle size distribution.

SUMMARY OF INVENTION

The present invention is a method for grinding silicon comprising grinding silicon in the presence of an effective amount of a grinding aid selected from the group consisting of carboxylic acids comprising at least 8 carbon atoms, alkali metal salts of carboxylic acids comprising at least 8 carbon atoms, and polydiorganosiloxanes.

DESCRIPTION OF INVENTION

The present invention is a method for grinding silicon metalloid comprising grinding silicon metalloid in the presence of an effective amount of a grinding aid selected from the group consisting of carboxylic acids comprising at least 8 carbon atoms, alkali metal salts of carboxylic acids comprising at least 8 carbon atoms, and polydiorganosiloxanes.

The silicon useful in the method may be chemical grade silicon metal often used in the direct synthesis of methylchlorosilanes which have an elemental composition of 0.100 to 0.280 Wt. % aluminum, 0 to 0.150 Wt. % calcium, 0.150 to 0.500 Wt. % iron and 0.015 to 0.050 Wt. % titanium. Chemical composition can enhance the reactivity and selectivity of the reaction to produce the alkylhalosilanes. Atomized silicon metal may also be employed in the method, where the chemical composition is 0.05–1% by weight Fe; 0.01–1% by weight Al; 0.0001–1% by weight Ca; 0–0.5% by weight Na 0–0.5% by weight Li; 0–0.5% by weight K; 0–0.5% by weight Mg; 0–0.5% by weight Sr; 0–0.5% by weight Ba; 0–0.5% by weight Be; and the remainder other impurities in small amounts. Also employable in the method is less expensive particulate water granulated silicon.

The grinding may be conducted in a mill such as a ball mill where the milling is performed by means of a rotating chamber within which there are placed free-rolling grinding media such as steel, stainless steel or tungsten carbide balls, ceramic cylinders, or flint pebbles, plus the silicon to be ground. The rotating chamber causes the grinding media to engage in abrasive action, crushing and grinding the silicon to the desired particle size. Preferably, the silicon is ground in a ball mill with stainless steel balls as the grinding media, however the grinding media may be any material that is compatible with the ground silicon. The ground silicon may be further classified as to particle size distribution by means of, for example, screening or use of mechanical classifiers such as a rotating classifier.

The grinding aid may be fed into the mill, for example, by using a metering pump.

The method for grinding silicon may be conducted in a batch process, semi-batch process, or a continuous process.

In the present method, it is desirable to grind the silicon to a particle size within a range of one micron to about 150 microns. Preferred, the silicon particle size is within a range of one to about 85 microns. Most preferred, the silicon particle size is within a range of two to about 50 microns. It is preferred that the silicon have a particle size mass distribution characterized by a $10^{th}$ percentile of 2.1 to 6 microns, a $50^{th}$ percentile of 10 to 25 microns, and a $90^{th}$ percentile of 30 to 60 microns. Most preferred is when the particle size mass distribution of the silicon is characterized by a $10^{th}$ percentile of 2.5 to 4.5 microns, a $50^{th}$ percentile of 12 to 25 microns, and a $90^{th}$ percentile of 35 to 45 microns.

The grinding aids used in the present method are selected from the group consisting of carboxylic acids comprising at least 8 carbon atoms, alkali metal salts of carboxylic acids comprising at least 8 carbon atoms, and polydiorganosiloxanes. An example of a suitable carboxylic acid are oleic acid, heptanoic acid, heptanedioic acid, 3-biphenylcarboxylic acid, naphthoic acid, octanedionic acid, nonanedioic acid and decanedioic acid. Alkali metal salts of carboxylic acids useful in the method contain at least 8 carbon atoms and include, for example sodium salts and potassium salts of carboxylic acids. Examples of alkali metal salts of carboxylic acids are potassium oleate, sodium oleate, potassium heptanoate, potassium heptanedioate, potassium 3-biphenylcarboxylate, potassium naphthoate, potassium octanedionioate, potassium nonanedioate, potassium decanedioate, sodium heptanoate, sodium heptanedioate, sodium 3-biphenylcarboxylate, sodium naphthoate, sodium octanedionioate, sodium nonanedioate, and sodium decanedioate.

The polydiorganosiloxanes useful as grinding aids in the present method can have a viscosity in the range of from 0.65 to about 2000 mm$^2$/sec at 25° C. Examples of suitable polydiorganosiloxanes are octamethylcyclotetrasiloxane, decamethylpentasiloxane and polydiorganosiloxanes, such as, for example polyphenylmethylsiloxane, poly-3,3,3-trifluoropropylmethylsiloxane and trimethylsiloxane endblocked polydimethylsiloxane fluids having a viscosity in the range of from 0.65 to about 2000 mm$^2$/sec at 25° C. Preferably the polydiorganosiloxane fluids have a viscosity in the range of from 1.0 to about 1000 mm$^2$/sec at 25° C., and most preferable the viscosity is from 10 to about 20 mm$^2$/sec at 25° C. The polydiorganosiloxanes are not limited to trimethylsiloxane endblocked polydiorganosiloxane fluids, but may include phenylmethyl, alkylmethyl, methylvinyl, and hydroxy endblocked fluids. A specific example of a trimethyl endblocked polydimethylsiloxane fluid useful in the present method is DOW CORNING 10 centistoke 200 Fluid™ (DOW CORNING CORPORATION, Midland, Mich.). Also useful in the present method are metal containing polydiorganosiloxanes such as trimethylsiloxane endblocked polydimethylsiloxane fluids containing metals such as copper, iron, zinc, and tin. In a preferred method a trimethylsiloxane endblocked polydimethylsiloxane fluids containing titanium, zirconium or hafnium is used as the grinding aid. A specific example of a metal containing polydiorganosiloxane useful in the present method is SYLTHERM 800™ (DOW CORNING CORPORATION, Midland, Mich.).

An effective amount of grinding aid is any amount that effects at least one of the following: increases mill capacity, increases silicon grinding rate, increases silicon flowability, decreases silicon agglomeration, or narrows silicon particle size distribution. Typically, an effective amount of grinding aid ranges from about 10 ppm to 1000 ppm. Preferably the amount of grinding aid ranges from about 100 ppm to 300 ppm. The optimum amount of grinding aid used may depend on such factors as the particular particle size distribution desired, mill type, and the grinding aid used. The maximum amount of grinding aid used is typically limited by economic constraints.

In grinding aid studies, literature sources cite the angle of repose as a measure of flowability in grinding aid studies. Increased mill capacity, increased grinding rate, increased silicon flowability, decreased silicon agglomeration, and narrowed silicon particle size distribution can all be determined by measuring the angle of repose. Angle of repose can be measured by pouring the ground silicon through a funnel with a 0.95 cm drain hole positioned three inches above a flat surface until a pile 5.08 cm to 7.62 cm high is formed. The angle of repose is calculated from the arc-tangent of twice the cone height divided by the pile diameter. In the present method amounts of the grinding aid which decrease angle of repose by 2 degrees to 3 degrees are considered as significant. Using grinding aids described herein, the angle of repose was reduced from a baseline average of 46 degrees to as low a 33 degrees. Flowability increases with the decrease in the angle of repose. Enhanced flowability can provide faster ground silicon removal from the production mill which leads to increase mill capacity, narrowed particle size distribution, and increased silicon grinding rate.

The following examples are provided to illustrate the present invention. These examples are not intended to limit the scope of the provided claims.

EXAMPLE 1

Evaluation of grinding silicon metal without a grinding aid. Silicon metal (800 g) was sieved to 4×6 mesh and charged into a cylindrical laboratory ball mill 25.4 cm in diameter and 18.4 cm in length containing 135, 2.54 cm diameter stainless steel balls totaling 8253 g in weight to grind the silicon metal. The ball mill was sealed and purged with nitrogen for 2 minutes. The ball mill was rotated at 51 rpm for 20 minutes. The resulting powder was sieved to 100 mesh and analyzed for particle size distribution using a Sedigraph Model 5100 manufactured by Micromeritics, One Micromeritics Drive, Norcross, Ga., 30093-1877. The results of the particle size analysis were used to calculate the cumulative mass percent for geometric size intervals from 13 to 150 microns. Data for geometric size intervals from 13 to 150 microns and the angle of repose, are presented in Table 1.

EXAMPLE 2

Evaluation of grinding silicon with oleic acid as a grinding aid.

The procedure as described in Example 1 was followed with the exception that 100 ppm of oleic acid was added to the ball mill. Data for geometric size intervals from 13 to 150 microns and angle of repose are presented in Table 1.

EXAMPLE 3

Evaluation of grinding silicon with SYLTHERM 800™ as a grinding aid. The procedure as described in Example 1 was followed with the exception that 100 pm of SYLTHERM 800™ was added to the ball mill. Data for geometric size intervals from 13 to 150 microns and angle of repose are presented in Table 1.

EXAMPLE 4

Evaluation of grinding silicon with DOW CORNING 10 centistroke 200 Fluid™ as a grinding aid. The procedure as described in Example 1 was followed with the exception that 100 ppm of DOW CORNING 10 centistoke 200 Fluid™ was added to the ball mill. Data for geometric size intervals from 13 to 150 microns and angle of repose are presented in Table 1.

EXAMPLE 5

Evaluation of grinding silicon with potassium oleate as a grinding aid. The procedure as described in Example 1 was followed with the exception that 100 ppm of potassium oleate was added to the ball mill. Data for geometric size intervals from 13 to 150 microns and angle of repose are presented in Table 1.

TABLE I

Angle of Repose and Cumulative Mass Percent

| Geometric Size (Microns) | Silicon Metal Without Grinding Aid | Oleic Acid | Syltherm 800 ™ | DOW CORNING 10 centistoke 200 Fluid ™ | Potassium Oleate |
|---|---|---|---|---|---|
| | Cumulative Mass Percent | | | | |
| 150 | 62% | 68% | 68% | 66% | 67% |
| 106 | 55% | 59% | 59% | 55% | 59% |
| 75 | 46% | 49% | 49% | 48% | 51% |
| 53 | 37% | 39% | 41% | 38% | 42% |
| 38 | 30% | 31% | 33% | 32% | 32% |
| 27 | 23% | 23% | 24% | 22% | 26% |
| 19 | 17% | 15% | 17% | 17% | 18% |

TABLE I-continued

Angle of Repose and Cumulative Mass Percent

| Geometric Size (Microns) | Silicon Metal Without Grinding Aid | Oleic Acid | Syltherm 800 ™ | DOW CORNING 10 centistoke 200 Fluid ™ | Potassium Oleate |
|---|---|---|---|---|---|
| 13 | 12% | 10% | 11% | 11% | 11% |
| Angle of Repose (Degrees) | 45.8 | 43.0 | 32.8 | 34.1 | 38.3 |

We claim:

1. A method for grinding silicon metalloid comprising, grinding silicon metalloid in the presence of an effective amount of a grinding aid selected from the group consisting of carboxylic acids comprising at least 8 carbon atoms, alkali metal salts of carboxylic acids comprising at least 8 carbon atoms, and polydiorganosiloxanes.

2. The method according to claim 1, where the alkali metal salt of carboxylic acid is potassium oleate.

3. The method according to claim 1, where the carboxylic acid is oleic acid.

4. The method according to claim 1, where the grinding aid amount ranges from about 10 to 1000 ppm.

5. The method according to claim 1, where the grinding aid amount ranges from about 100 to 300 ppm.

6. The method according to claim 1, where the polydiorganosiloxane is a trimethylsiloxy endblocked polydimethylsiloxane fluid containing a metal selected from the group consisting of titanium, zirconium and hafnium.

7. The method according to claim 1, where the polydiorganosiloxane is a trimethylsiloxy endblocked polydimethylsiloxane.

8. The method according to claim 1, where the silicon metalloid has a particle size within a range of one micron to about 150 microns.

9. The method according to claim 1, where the silicon metalloid has a particle size within a range of one micron to about 85 microns.

10. The method according to claim 1, where the silicon metalloid has a particle size within a range of two micron to about 50 microns.

11. The method according to claim 1, where the grinding is conducted in a ball mill.

12. The method according to claim 1, where the grinding is conducted as a batch process.

13. The method according to claim 1, where the grinding is conducted as a semi-batch process.

14. The method according to claim 1, where the grinding is conducted as a continuous process.

15. The method according to claim 1, where the silicon metalloid after the grinding has an angle of repose in the range of about 32 degrees to 43 degrees.

* * * * *